United States Patent Office 3,527,788
Patented Sept. 8, 1970

3,527,788
1-PROPARGYLOXY-2-CARBAMOYLOXY-3-PROPYLOXY PROPANE
Michel Louis Delalande, Paris, France, assignor to Delalande S.A., Courbevoie, Hauts-de-Seine, France, a corporation of France
No Drawing. Filed July 26, 1966, Ser. No. 567,861
Claims priority, application Great Britain, July 27, 1965, 31,936/65
Int. Cl. C07c 101/00
U.S. Cl. 260—482                                1 Claim

ABSTRACT OF THE DISCLOSURE

A compound of the formula

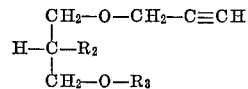

in which $R_2$ is hydroxyl or —O—CO—$NH_2$
$R_3$ is selected from the group consisting of
  (1) a lower aliphatic hydrocarbyl;
  (2) a cycloalkyl radical;
  (3) an ω-chloroalkyl radical in which the alkyl contains from 2 to 4 carbon aotms;
  (4) a morpholinoalkyl radical in which the alkyl contains from 2 to 4 carbon atoms;
  (5) a benzene nucleus and a benzene nucleus substituted with one or more members selected from the group consisting of
    (a) an alkyl containing from 1 to 3 carbon atoms,
    (b) an acyl containing 2 or 3 carbon atoms,
    (c) chloro,
    (d) trifluoromethyl;
  (6) an arylaliphatic radical;
  (7) an aryloxyalkyl radical;
  (8) an α or β naphthyl radical.

---

This invention relates to derivatives of propargylic ethers of propane.

According to one aspect of the present invention there is provided derivatives of propargylic ethers of propane having the general formula

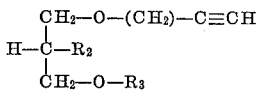

where $R_2$ is hydroxyl or —O—CO—$NH_2$
$R_3$ is selected from the group consisting of
  (1) a lower aliphatic hydrocarbyl including saturated hydrocarbyls, such as methyl, ethyl, propyl, isopropyl, butyl, s-butyl, isobutyl, t-butyl and pentyl, and unsaturated hydrocarbyls such as allyl and propargyl;
  (2) a cycloalkyl radical, such as cyclopentyl and cyclohexyl;
  (3) an ω-chloroalkyl radical containing 2 to 4 carbon atoms;
  (4) a morpholinoalkyl radical in which the alkyl contains 2 to 4 carbon atoms;
  (5) a benzene nucleus which may be substituted with one or more members selected from the group consisting of
    (a) an alkyl containing 1 to 3 carbon atoms,
    (b) an acyl containing 2 or 3 carbon atoms,
    (c) chloro,
    (d) trifluoromethyl;
  (6) an arylaliphatic radical, such as benzyl, cinnamyl, phenylisopropyl and phenethyl;
  (7) an aryloxyalkyl radical, such as phenoxyethyl;
  (8) an α or β naphthyl radical.

$R_3$ may be a methyl, ethyl, propyl, isopropyl, n-butyl, s-butyl, isobutyl or amyl radical or it may be an allyl or propargyl radical. Again $R_3$ may be a 2-chloroethyl, 3-chloroethyl, 3-chloropropyl or a 4-chlorobutyl radical.

According to another aspect of the present invention the aforesaid derivative in the case when $R_2$ is OH may be prepared by a process which comprises reacting on epoxy-propane of formula

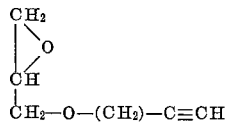

with a compound of formula $R_3$—OM where $R_3$ has the same meaning as above and M is hydrogen or an alkali metal.

In such a process, the epoxy-propane is 1-propargyl-2,3-epoxy propane. In this case the reaction may be carried out in an anhydrous medium in the presence of boron trifluoride etherate.

According to a third aspect of the present invention the aforesaid derivative in the case when $R_2$ is OH may be prepared by a process in which a 1-alkoxy or -1-aryloxy-2,3-epoxypropane of formula

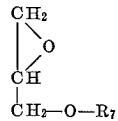

where $R_7$ is an alkyl or aryl group is reacted with an alcohol of formula

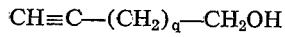

where $q$ is 0 or an integer from 1 to 3 inclusive.

In this process $q$ is preferably 0, the alcohol being propargyl alcohol. In the last embodiment the reaction is carried out in an anhydrous medium in the presence of boron trifluoride etherate.

According to yet another aspect of the present invention the aforesaid derivative in the case when $R_2$ is OH may be prepared by a process in which a compound of formula

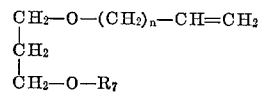

where $R_7$ is an alkyl or aryl group is first halogenated and then dehydrohalogenated.

In a preferred embodiment of the said process the derivative may be first brominated and then dehydrobrominated. Bromination may be carried out by treating the compound with bromine in carbon tetrachloride and dehydrobromination by treating the product of bromination with sodamide in liquid ammonia.

The process may also be used when the radical to be introduced is a phenol radical, consists substantially in heating 1-propargyloxy-2,3 epoxypropane with alkaline phenolate for approximately 2 hours. The desired product is extracted by means of ether from the reaction mixture which has previously been cooled. The ether is then removed from the volatile solution obtained, the desired product being distilled under reduced pressure in a neutral atmosphere.

The following examples illustrate the preparation of certain compounds according to the invention.

EXAMPLE 1

1-Propargyloxy-3-n-propyloxy-2-propanol

One mol of 1-propargyloxy-2,3-epoxypropane is introduced drop by drop and at a temperature between 60° and 70° into a mixture of 3 mols of n-propanol and 8 ml. of a solution of 3% boron trifluoride in ether with vigorous stirring.

During the whole of this addition, the temperature is kept at 70° C. and then left in contact for 15–20 minutes.

The mixture is cooled and 20 ml. of water added again with vigorous agitation.

The excess propanol is removed at 40–45° C. under 50 mm. Hg. The product is then distilled under reduced pressure and in a nitrogen atmosphere E/0.3:84°.

EXAMPLE 2

1-Propargyloxy-3-benzyloxy-2-propanol 1 mol of 1-propargyloxy-2,3-epoxypropane-2,3 is introduced drop by drop, with agitation, into a mixture of 3 mols of benzyl alcohol and 8 ml. of a 0.3% solution of boron trifluoride, the mixture being previously heated to 50° C.

The reaction is exothermal so that the preparation must be cooled externally to keep the internal temperature at 60° C. The mixture is then left in contact at ordinary temperature for 1 hour.

20 ml. water are added whilst agitating the mixture. A separation is then effected by distillation of benzyl alcohol (E/1.4:77°). Then the desired product is distilled under reduced pressure and in a nitrogen atmosphere: E/0.001:140° C.

EXAMPLE 3

1-Propargyloxy-3-phenoxy-2-propanol

A mixture of 1-propargyloxy-2,3-epoxypropane (0.75 mol) and of sodium phenolate (1.3 mol of phenol+0.9 mol NaOH+300 ml. water), is heated for two hours at 60° C. with agitation.

The mixture is allowed to cool and extracted twice with 200 ml. ether each time. The volatile solution is first washed with a sodium solution, then twice in water. Drying is effected over sodium sulphate; the ether is removed and the product distilled under reduced pressure in an atmosphere of nitrogen: E/0.005:125° C.

EXAMPLE 4

1-Propargyloxy-3-n-propyloxy-2-carbamyl propane 1 mol of 1-propargyloxy-3-n-propyloxy-2-propanol is treated in the presence of 1 mol of diethylaniline with 1.5 mol phosgene in toluene solution.

The temperature rises rapidly to 60.65° C. Heating is then effected for one hour to maintain the temperature at 60° C. After it had been cooled 50 ml. water is added. The phosgene is removed by trapping it carefully in 2 sodium alcohol bubblers.

The diether alcohol chloro carbonate thus formed is treated directly without being isolated by a current of gaseous ammonia for 2–3 hrs.

The mixture is washed twice with 200 ml. water. The toluene is then removed and the product distilled under reduced pressure in a nitrogen atmosphere: E/0.04: 148° C.

EXAMPLE 5

1-Propargyloxy-3-benzyloxy-2-carbamyl propane 1 mol of 1-propargyloxy-3-benzyloxy-2 propanol is treated in the presence of 1 mol of diethyl aniline with 1.5 mol of phosgene in toluene solution.

The resultant hydrochloride is separated by addition of water and the excess phosgene is removed. The chlorocarbonate of the diether alcohol formed is then treated without isolating it from the reaction mixture in a stream of gaseous ammonia.

The mixture is washed twice with 200 ml. water. Half the toluene is removed and the product allowed to crystallise. After drying and washing in petroleum ether a product of M.P. 62° C. is obtained.

EXAMPLE 6

1-Propargyloxy-3-phenoxy-2-carbamyl propane 1 mol of 1-propargyloxy-3-phenoxy - 2 - propanol is treated in the presence of 1 mol of diethyl aniline with 1.5 mol phosgene in toluene solution.

After separation of the hydrochloride amine followed by elimination of the excess phosgene, the chloro-carbonate obtained is treated in gaseous ammonia.

200 ml. of water is added to dissolve the ammonium chloride: The product crystallises immediately. It is dried, washed in water, then recrystallised in absolute alcohol. The final product has a M.P. of 98° C.

EXAMPLE 7

1-Propargyloxy-3-butoxy propane 3-butoxy-1-propanol and 1-allyloxy-3-butoxy propane is first prepared by treating in succession 1,3-propanediol in boiling toluene, in the presence of sodium with butyl bromide and, then with allyl bromide.

The ethylene derivative obtained (E/0.05:50–55°) is dibrominated by action of bromide in carbon tetrachloride at −8° C. 1 mol of dibrominated compound is purified by distillation and then treated with 3 mols of sodium amide in suspension in liquid ammonia.

After evaporation of the ammonia and extraction in ether, the oxydeacetylene ether is distilled: E/0.4:55° C.

The compounds listed in Tables I, II and III below have been specially prepared as described above, the tables also give experimental and theoretical data concerning the various compounds in the tables.

In Table I the compounds have the basic formula

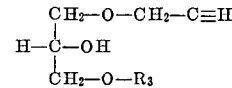

$$\begin{array}{c} CH_2-O-CH_2-C\equiv H \\ | \\ H-C-OH \\ | \\ CH_2-O-R_3 \end{array}$$

various groups corresponding to $R_3$ being given in the first column of the table.

TABLE I

| | Empirical formula | Molecular weight | $N_D^{20}$ | Theoretical | | | | | Actual | | | | |
|---|---|---|---|---|---|---|---|---|---|---|---|---|---|
| | | | | C | H | O | N | Cl | C | H | O | N | Cl |
| —CH₃ | C₇H₁₂O₃ | 144, 166 | 1.4536 | 58.31 | 8.40 | 33.29 | | | 58.25 | 8.38 | 33.44 | | |
| —C₂H₅ | C₈H₁₄O₃ | 158, 192 | 1.4502 | 60.74 | 8.92 | 30.34 | | | 60.67 | 8.84 | 30.41 | | |
| —CH₂—CH=CH₂ | C₉H₁₄O₃ | 170, 202 | 1.4639 | 63.50 | 8.29 | 28.20 | | | 63.43 | 8.15 | 28.39 | | |
| —CH₂—C≡CH | C₉H₁₂O₃ | 168, 186 | 1.4738 | 64.27 | 7.19 | 28.54 | | | 64.44 | 7.12 | | | |
| —(CH₂)₂—CH₃ | C₉H₁₆O₃ | 172, 248 | 1.4490 | 62.76 | 9.36 | 27.87 | | | 62.68 | 9.22 | 28.02 | | |
| —CH(CH₃)₂ | C₉H₁₆O₃ | 172, 248 | 1.4468 | 62.76 | 9.36 | 27.87 | | | 62.65 | 9.32 | 28.00 | | |
| —(CH₂)₃CH₃ | C₁₀H₁₈O₃ | 186, 244 | 1.4494 | 64.49 | 9.74 | 27.77 | | | 64.44 | 9.51 | | | |
| —CH₂—CH(CH₃)₂ | C₁₀H₁₈O₃ | 186, 244 | 1.4468 | 64.49 | 9.74 | 27.77 | | | 64.40 | 9.64 | 25.91 | | |
| —CH—(CH₃)C₂H₅ | C₁₀H₁₈O₃ | 186, 244 | 1.4478 | 64.49 | 9.74 | 26.77 | | | 64.36 | 9.64 | 25.89 | | |
| —C(CH₃)₃ | C₁₀H₁₈O₃ | 184, 244 | 1.4471 | 64.49 | 9.74 | 26.77 | | | 64.58 | 9.70 | 25.97 | | |
| —(CH₂)₄—CH₃ | C₁₁H₂₀O₃ | 200, 270 | 1.4451 | 65.96 | 10.07 | 23.97 | | | 65.82 | 9.90 | 24.05 | | |
| —C₅H₉ | C₁₁H₁₈O₃ | 198, 254 | 1.4732 | 66.67 | 9.15 | 24.21 | | | 66.53 | 8.96 | 24.43 | | |
| —C₆H₁₁ | C₁₂H₂₀O₃ | 212, 280 | 1.4759 | 67.89 | 9.50 | 22.61 | | | 67.76 | 9.33 | 22.94 | | |
| —(CH₂)₂Cl | C₈H₁₃O₃Cl | 192, 641 | 1.4748 | 49.88 | 6.80 | 44.92 | | 18.40 | 49.68 | 6.63 | 25.11 | | 18.3 |

TABLE I—Continued

| | Empirical formula | Molecular weight | $N_D^{20}$ | Analysis Theoretical | | | | | Actual | | | | |
|---|---|---|---|---|---|---|---|---|---|---|---|---|---|
| | | | | C | H | O | N | Cl | C | H | O | N | Cl |
| —(CH$_2$)$_3$Cl | C$_9$H$_{15}$O$_3$Cl | 206,667 | 1.4719 | 52.30 | 7.32 | 23.22 | _____ | 17.16 | 52.49 | 7.20 | 23.40 | _____ | 17.0 |
| —(CH$_2$)$_4$Cl | C$_{10}$H$_{17}$O$_3$Cl | 220,693 | 1.4725 | 54.42 | 7.76 | 21.75 | _____ | 16.07 | 54.39 | 7.76 | 21.90 | _____ | 15.97 |
| —(CH$_2$)$_2$—N(C$_4$H$_8$)O | C$_{12}$H$_{20}$NO$_4$ | 243,296 | 1.4874 | 59.24 | 8.70 | 26.30 | 5.76 | _____ | 59.23 | 8.86 | 26.49 | 5.93 | _____ |
| —(CH$_2$)$_4$—N(C$_4$H$_8$)O | C$_{14}$H$_{25}$NO$_4$ | 271,348 | 1.4861 | 61.96 | 9.29 | 23.59 | 5.16 | _____ | 61.88 | 9.22 | 23.72 | 5.27 | _____ |
| —(CH$_2$)$_3$—N(C$_4$H$_8$)O | C$_{13}$H$_{23}$NO$_4$ | 257,322 | 1.4868 | 60.67 | 9.01 | 24.87 | 5.44 | _____ | 60.43 | 9.16 | 25.06 | 5.62 | _____ |
| —C$_6$H$_5$ | C$_{12}$H$_{14}$O$_3$ | 206,232 | 1.5280 | 69.88 | 6.84 | 23.27 | _____ | _____ | 69.76 | 6.88 | 24.49 | _____ | _____ |
| —CH$_2$—C$_6$H$_5$ | C$_{13}$H$_{16}$O$_3$ | 220,258 | 1.5197 | 70.89 | 7.32 | 21.79 | _____ | _____ | 70.74 | 7.19 | 22.04 | _____ | _____ |
| —CH$_2$—CH=CH—C$_6$H$_5$ | C$_{15}$H$_{18}$O$_3$ | 246,294 | 1.5451 | 73.14 | 8.37 | 19.49 | _____ | _____ | 72.94 | 7.24 | 19.63 | _____ | _____ |
| —2-4(iC$_3$H$_7$)(CH$_3$)C$_6$H$_3$ | C$_{16}$H$_{22}$O$_3$ | 262,336 | 1.5150 | 73.26 | 8.45 | 18.30 | _____ | _____ | 73.21 | 8.30 | 18.54 | _____ | _____ |
| —2(—CO—CH$_3$)C$_6$H$_4$— | C$_{14}$H$_{16}$O$_4$ | 248,268 | 1.5413 | 67.73 | 6.50 | 25.78 | _____ | _____ | 67.59 | 6.46 | 25.90 | _____ | _____ |
| —4(COCH$_2$CH$_3$)C$_6$H$_4$ | C$_{15}$H$_{18}$O$_4$ | 262,294 | 1.5473 | 68.68 | 6.92 | 24.40 | _____ | _____ | 68.52 | 6.92 | 24.63 | _____ | _____ |
| —2-C$_{10}$H$_7$— | C$_{16}$H$_{16}$O$_3$ | 256,288 | 1.5935 | 74.98 | 6.29 | 18.73 | _____ | _____ | 74.88 | 6.16 | 19.06 | _____ | _____ |
| —4Cl—C$_6$H$_4$ | C$_{12}$H$_{13}$ClO$_3$ | 240,681 | 1.540 | 59.88 | 5.44 | 19.94 | _____ | 14.73 | 59.72 | 5.57 | 20.11 | _____ | 14.63 |
| —3(—CF$_3$)—C$_6$H$_4$ | C$_{13}$H$_{13}$F$_3$O$_3$ | 274,234 | 1.4802 | 56.93 | 4.78 | 17.50 | _____ | 20.79 | 56.85 | 4.65 | _____ | _____ | 20.52 |
| —2(CH$_3$)C$_6$H$_5$ | C$_{13}$H$_{16}$O$_3$ | 220,258 | 1.5250 | 70.89 | 7.32 | 21.79 | _____ | _____ | 70.77 | 7.25 | 21.94 | _____ | _____ |
| 1-C$_{10}$H$_7$ | C$_{16}$H$_{16}$O$_3$ | 256,288 | 1.5910 | 74.98 | 6.29 | 18.73 | _____ | _____ | 74.81 | 6.18 | 18.97 | _____ | _____ |
| (CH$_2$)$_2$—O—C$_6$H$_5$ | C$_{14}$H$_{19}$O$_4$ | 250,284 | 1.5202 | 67.18 | 7.25 | 25.57 | _____ | _____ | 67.01 | 7.23 | 25.77 | _____ | _____ |
| —C(CH$_3$)$_2$—C$_6$H$_5$ | C$_{15}$H$_{20}$O$_3$ | 248,31 | 1.5103 | 72.55 | 8.12 | 19.33 | _____ | _____ | 72.45 | 8.22 | 19.52 | _____ | _____ |
| (CH$_2$)$_2$—C$_6$H$_5$ | C$_{14}$H$_{18}$O$_3$ | 234,284 | 1.5159 | 71.77 | 7.74 | 20.49 | _____ | _____ | 71.76 | 7.94 | 20.53 | _____ | _____ |

In Table II the compounds have the basic formula

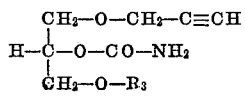

various groups corresponding to $R_3$ being given in the first column of the table.

tives which cause slight transient variations of tension in the cardiovascular system only when administered intravenously in strong doses.

In the case of human beings the derivatives of the invention have been used to effect cures in the cases of (1) great anxiety of a patient suffering from Parkinson's disease.

TABLE II

| $R_3$ or Ar | Empirical formula | Molecular weight | $N_D^{20}$ | Analysis Calculated | | | | | Elementary Found | | | | |
|---|---|---|---|---|---|---|---|---|---|---|---|---|---|
| | | | | C | H | O | N | Cl | C | H | O | N | Cl |
| (CH$_2$)$_3$—CH$_3$ | C$_{11}$H$_{19}$NO$_4$ | 229,270 | 1.4642 | 57.62 | 8.35 | 27.91 | 6.11 | _____ | 57.49 | 8.32 | 27.88 | 6.23 | _____ |
| —CH$_3$ | C$_8$H$_{13}$NO$_4$ | 187,192 | 1.4722 | 51.33 | 7.00 | 34.19 | 7.48 | _____ | 51.51 | 7.12 | 34.22 | 7.52 | _____ |
| —CH$_2$—CH=CH$_2$ | C$_{10}$H$_{15}$NO$_4$ | 213,228 | 1.4779 | 56.32 | 7.09 | 30.01 | 6.57 | _____ | 56.24 | 7.04 | 30.22 | 6.71 | _____ |
| —CH$_2$—C≡CH | C$_{10}$H$_{13}$NO$_4$ | 211,212 | 1.4858 | 56.86 | 6.20 | 30.30 | 6.63 | _____ | 56.76 | 6.23 | 30.41 | 6.82 | _____ |
| —(CH$_2$)$_2$—CH$_3$ | C$_{10}$H$_{17}$NO$_4$ | 215,244 | 1.4642(219) | 55.79 | 7.96 | 29.73 | 6.51 | _____ | 55.99 | 7.98 | 29.84 | 6.60 | _____ |
| —CH$_2$—CH—(CH$_3$)$_2$ | C$_{11}$H$_{19}$NO$_4$ | 229,270 | 1.4611(22°) | 57.62 | 8.35 | 27.91 | 6.11 | _____ | 57.47 | 8.52 | 28.16 | 6.11 | _____ |
| —CH(C$_2$H$_5$)CH$_3$ | C$_{11}$H$_{19}$NO$_4$ | 229,270 | 1.4634 | 57.62 | 8.35 | 27.91 | 6.11 | _____ | 57.47 | 8.24 | 27.89 | 6.18 | _____ |
| (CH$_2$)$_4$—CH$_3$ | C$_{12}$H$_{21}$NO$_4$ | 243,296 | 1.4630 | 59.24 | 8.70 | 26.31 | 5.76 | _____ | 59.40 | 8.51 | 26.44 | 5.82 | _____ |
| —CH—(CH$_3$)$_2$ | C$_{10}$H$_{17}$NO$_4$ | 215,244 | 1.4639 | 55.80 | 7.96 | 29.73 | 6.51 | _____ | 55.79 | 8.03 | 29.95 | 6.68 | _____ |
| —C$_2$H$_5$ | C$_9$H$_{15}$NO$_4$ | 201,218 | (*) | 53.72 | 7.51 | 31.81 | 6.96 | _____ | 53.88 | 7.69 | 31.75 | 6.88 | _____ |
| C—(CH$_3$)$_3$ | C$_{11}$H$_{19}$NO$_4$ | 229,270 | 1.4648 | 57.62 | 8.35 | 27.92 | 6.11 | _____ | 57.59 | 8.29 | 28.04 | 6.25 | _____ |
| —C$_6$H$_{11}$ | C$_{13}$H$_{21}$NO$_4$ | 255,306 | 1.4862 | 61.15 | 8.29 | 25.07 | 5.48 | _____ | 61.08 | 8.45 | 24.89 | 5.29 | _____ |
| —C$_5$H$_9$ | C$_{12}$H$_{19}$NO$_4$ | 241,280 | 1.4842 | 59.73 | 7.94 | 26.52 | 5.81 | _____ | 59.63 | 7.96 | 26.77 | 5.86 | _____ |
| (CH$_2$)$_2$Cl | C$_9$H$_{14}$NO$_4$Cl | 235,667 | _____ | 45.87 | 5.99 | 27.16 | 5.94 | 15.05 | 45.81 | 6.09 | 27.12 | 5.86 | 14.94 |
| —C$_6$H$_5$ | C$_{13}$H$_{15}$NO$_4$ | 249,258 | (*) | 62.64 | 6.07 | 25.67 | 5.62 | _____ | 62.84 | 6.24 | 25.56 | 5.72 | _____ |
| CH$_2$—C$_6$H$_5$ | C$_{14}$H$_{17}$NO$_4$ | 263,284 | (*) | 63.86 | 6.51 | 24.31 | 5.32 | _____ | 63.73 | 6.63 | 24.24 | 5.30 | _____ |
| 2-(CH$_3$)C$_6$H$_5$ | C$_{14}$H$_{17}$NO$_4$ | 263,284 | (*) | 63.86 | 6.51 | 24.31 | 5.32 | _____ | 63.74 | 6.30 | 24.50 | 5.44 | _____ |
| 3(CF$_3$)C$_6$H$_5$ | C$_{14}$H$_{22}$N$_2$O$_5$ | 317,260 | _____ | 53.00 | 4.45 | 20.17 | 4.42 | F17.97 | 52.81 | 4.30 | _____ | 4.58 | F17.76 |

In Table III the compounds have the basic formula

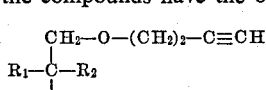

the various groups corresponding to $R_1$, $R_2$ and $R_3$ being given in the first three columns of the table.

(2) anxiety crises in a patient having gross cardiac insufficiency and who had been treated with digitalis for 10 years.

(3) melancholia and insomnia with violent and persistant headaches in a patient suffering from anxiety due to anxiogenic proximity to a psychopath.

(4) progressive decline of intellectual ability due to a minor depressed condition.

TABLE III

| $R_1$ | $R_2$ | $R_3$ | Empirical formula | Molecular weight | $N_D^{20}$ | Analysis Calculated | | | | Elementary Found | | | |
|---|---|---|---|---|---|---|---|---|---|---|---|---|---|
| | | | | | | C | H | O | N | C | H | O | N |
| H | OH | H | C$_6$H$_{10}$O$_3$ | 130,140 | 1.4748 | 55.37 | 7.75 | 36.88 | _____ | 55.39 | 7.74 | 37.04 | _____ |
| H | H | C$_4$H$_9$ | C$_{10}$H$_{18}$O$_2$ | 170,244 | 1.4332 | 70.55 | 10.66 | 18.79 | _____ | 70.48 | 10.61 | 19.01 | _____ |
| H | OCONH$_2$ | CONH$_2$ | C$_8$H$_{12}$N$_2$O$_5$ | 216,192 | (*) | 44.44 | 5.60 | 37.00 | 12.96 | 44.34 | 5.72 | 37.14 | 12.81 |

The derivatives of the inventions have been tested on animals to give myo-relaxing properties by depression of the intercalary neurones of the vertebra marrow. These also act as tranquillers. They have no hypnotic, curarising or neuroleptic action. The smooth muscular fibre of the autonomous nervous system is unaffected by the deriva- The embodiments of the invention in which an exclusive property or privilege is claimed are defined as follows:

1. 1-propargyloxy-2-carbamoyloxy-3-propyloxy propane.

(References on following page)

References Cited

UNITED STATES PATENTS

| | | | |
|---|---|---|---|
| 2,609,386 | 9/1952 | Lott et al. | 260—482 |
| 2,770,649 | 11/1956 | Murphey | 260—482 |
| 2,813,104 | 11/1957 | McDowell. | |
| 3,059,022 | 10/1962 | Berger et al. | 260—482 |
| 3,161,567 | 12/1964 | Collins et al. | 260—482 |

OTHER REFERENCES

Houben-Weyl: Methoden Der Organischen Chemie, Band VI/3, Saverstoff Verbindunjen I, Teil 3, pp. 40–44 (1965).

Adams et al.: Chemical Reviews, volume 65, pp. 567 and 570 (1965).

Wagner et al.: Synthetic Organic Chemistry, pp. 645–647 and 483–484 (1963).

Stecher, editor: Merck Index of Chemicals and Drugs, seventh edition, p. 667 (1960).

Wagner et al.: Synthetic Organic Chemistry, 1953, pp. 233–234.

CHARLES B. PARKER, Primary Examiner

C. F. WARREN, Assistant Examiner

U.S. Cl. X.R.

260—999; 424—300